March 28, 1961  S. J. SOOS  2,977,004
ENSILAGE ELEVATOR

Filed Jan. 7, 1957  3 Sheets-Sheet 1

Steve J. Soos
INVENTOR.

BY *Clarence A. O'Brien*
*and Harvey B. Jacobson*
Attorneys

March 28, 1961 S. J. SOOS 2,977,004
ENSILAGE ELEVATOR
Filed Jan. 7, 1957 3 Sheets-Sheet 2

Steve J. Soos
INVENTOR.

BY *Clarence A. O'Brien
and Harvey B. Jacobson*
Attorneys

March 28, 1961   S. J. SOOS   2,977,004
ENSILAGE ELEVATOR

Filed Jan. 7, 1957   3 Sheets-Sheet 3

Steve J. Soos
INVENTOR.

United States Patent Office 2,977,004
Patented Mar. 28, 1961

2,977,004

ENSILAGE ELEVATOR

Steve J. Soos, 111 Jefferson St., Fords, N.J., assignor of one-third to Fred Popovitch, Point Pleasant, and Tibor Vigh, Woodbridge, N.J.

Filed Jan. 7, 1957, Ser. No. 632,778

3 Claims. (Cl. 214—17)

This invention relates in general to new and useful improvements in farm equipment, and more specifically to an improved ensilage elevator.

After ensilage has been cut, it is necessary that it be stored for the winter in silos and the like. Since a silo can be filled only from the top with ensilage, it is necessary that the ensilage be elevated to the top of the silo and then be deposited therein. Heretofore there have been devised various types of conveyors for elevating ensilage and the like. However, the conveyors are of such a nature whereby the operation is relatively slow and requires the presence of the farm wagon or the truck is tied up during the unloading operation. It is therefore the primary object of this invention to provide an ensilage elevator which is so constructed whereby an entire wagon or truck load of ensilage may be dumped into the elevator and the ensilage gradually elevated into the upper part of silo or other storage building while the farm wagon or the truck is returned to the field to take on another load.

Another object of this invention is to provide an ensilage elevator which includes a vertical housing having a vertical conveyor therein, there being positioned immediately adjacent the vertical housing a hopper, the hopper being of a large size and being adapted to receive an entire wagon or truck load of ensilage, the hopper being provided with suitable means for conveying the ensilage to the vertical conveyor whereby the wagon or truck load of ensilage is gradually fed to the vertical conveyor for storage in a silo or the like.

A further object of this invention is to provide an improved hopper construction for ensilage elevators, the hopper construction including an enlarged hopper having a narrow bottom part and upwardly and outwardly sloping upper walls, the hopper being of a size to substantially receive an entire farm wagon or truck load of ensilage and being provided at the lower part thereof with a horizontal conveyor for moving the ensilage from the hopper to the vertical elevator.

A still further object of this invention is to provide an improved ensilage elevator which includes a hopper, the hopper being relatively large and of a size to receive an entire wagon or truck load of ensilage, the hopper having a narrow bottom part on which there is positioned a horizontal conveyor for progressively moving the ensilage to a vertical conveyor, there being mounted within the upper part of the hopper suitable agitator means to insure the downward movement of the ensilage through the horizontal conveyor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
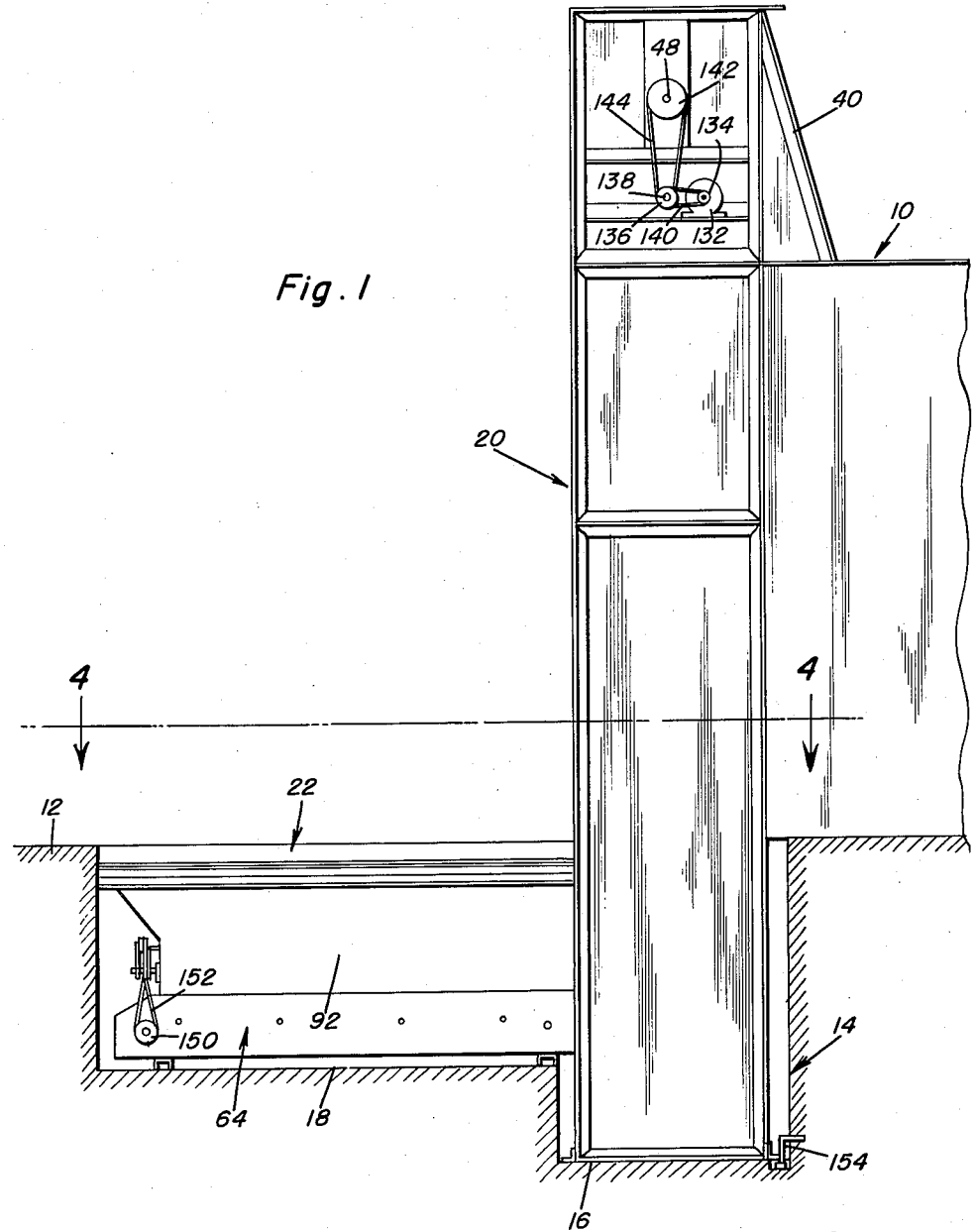
Figure 1 is a vertical sectional view taken through the ground adjacent a silo or other storage building and shows in elevation the general details of the silage elevator which is the subject of this invention.
Figure 4:
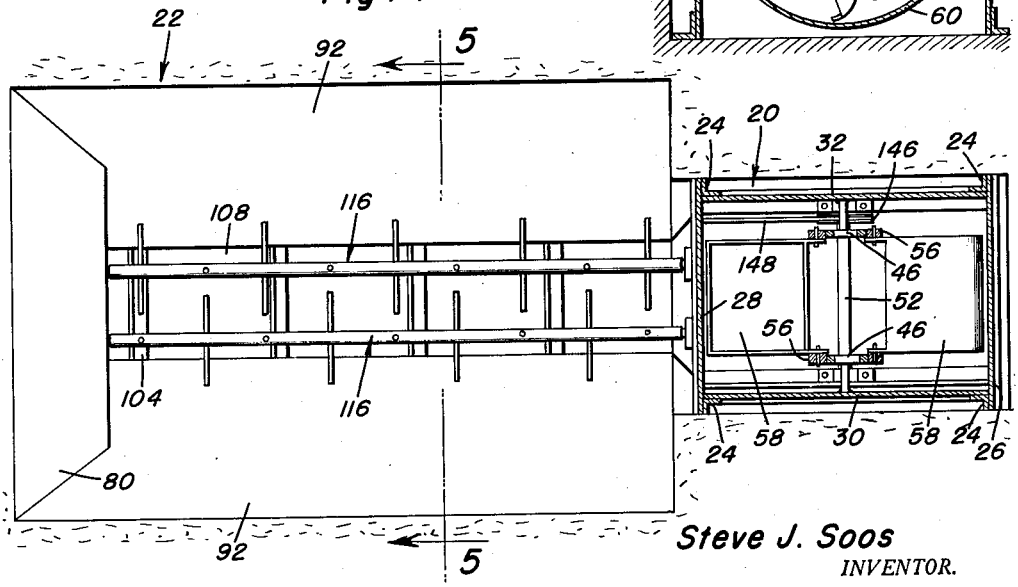
Figure 5:
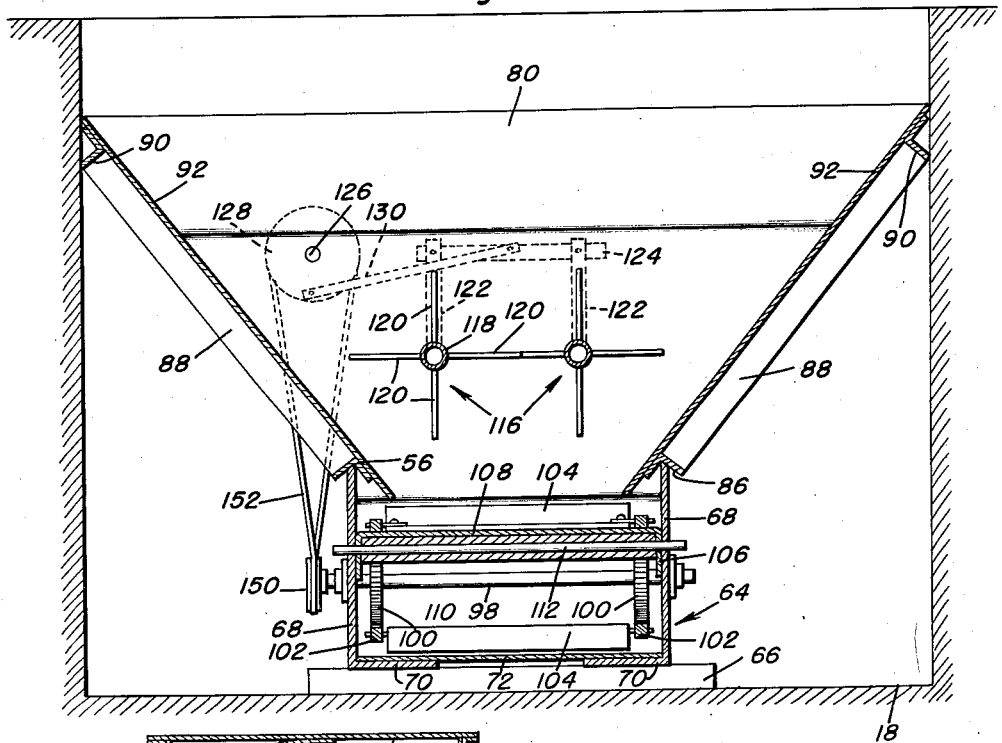

Figure 4 is an enlarged horizontal sectional view taken substantially upon the plane indicated by the section line 4—4 of Figure 1 and shows the general details of the hopper as viewed in plan together with the general details of construction of the vertical conveyor; and Figure 5 is an enlarged transverse vertical sectional view taken through the hopper and shows the specific details of the horizontal conveyor mounted therein and the agitators mounted in the upper part of the hopper for delivering ensilage down to the horizontal conveyor.

Referring now to the drawings in detail, it will be seen that there is illustrated in Figure 1, a silo or other ensilage storage building which is referred to in general by the reference numeral 10. Formed in the ground 12 immediately adjacent the storage building 10 is a pit 14 which includes a relatively deep portion 16 immediately adjacent the storage building 10 and a shallower portion 18 which is elongated and which is remote from the storage building 10. Positioned in the deep portion 16 of the pit 14 and extending vertically alongside the storage building 10 is an upright housing which is referred to in general by the reference numeral 20. Disposed within the shallower portion 18 of the pit 14 and connected to the upright housing 20 is a hopper which is referred to in general by the reference numeral 22.

Referring now to Figure 4 in particular, it will be seen that the housing 20 is generally rectangular in cross-section and is formed primarily of vertical frame members 24 disposed at the corners thereof. Extending between the upright frame members 24 and secured thereto are end walls 26 and 28 and side walls 30 and 32. The walls of the upright housing 20 and the vertical frame members 24 will be braced by other suitable frame members, as is best illustrated in Figure 1. It is to be understood that the details of construction of the upright housing 20 will vary depending upon the particular requirements.

Figure 3:
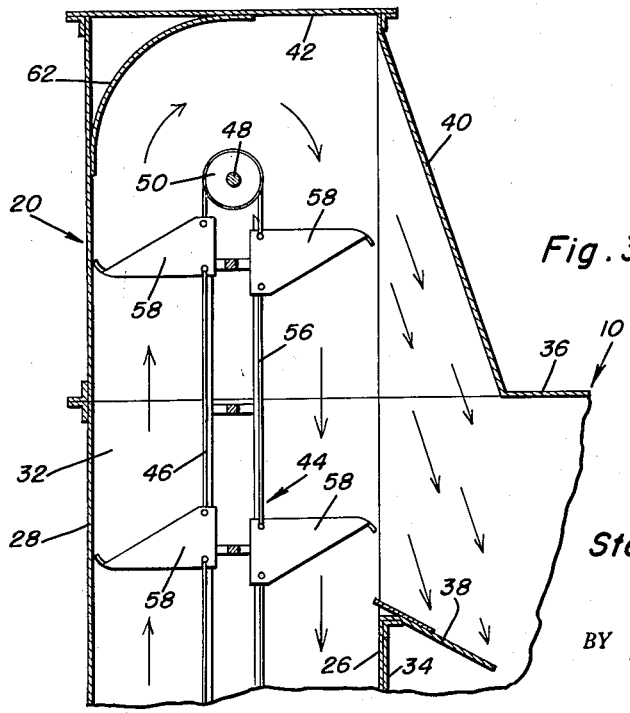
Figure 3 is an enlarged fragmentary vertical sectional view taken through the upper part of the upright housing and the vertical conveyor and shows the arrangement of the vertical conveyor at the upper end thereof with respect to a chute portion of the housing for delivering ensilage into a silo or other storage building.

Referring now to Figure 3 in particular, it will be seen that the storage building 10 includes a top wall 36 and a side wall 34. The side wall 34 terminates below the top wall 36 in the vicinity of the end wall 26 of the housing 20. It is also to be noted that the end wall 26 does not extend the full height of the housing. Carried by the end wall 26 and the side wall 34 is a chute 38 which extends downwardly into the storage building 10 away from the housing 20. The storage building 10 in the vicinity of the housing 20 is also provided with an extension of the top wall 36, the extension being referred to by the reference numeral 40 and extending upwardly and away from the top wall 36, the upper end of the extension 40 being connected to the upper portion of the housing 20 adjacent the top wall 42 thereof.

Mounted within the upright housing 20 for elevating ensilage and the like and dumping the ensilage into the storage building 10 is a vertical conveyor which is referred to in general by the reference numeral 44. The conveyor 44 includes a centrally located vertically extending guide 46 which is suitably secured to the side walls 30 and 32 of the housing 20. Also carried by the side walls 30 and 32 adjacent the upper end of the housing 20 and in alignment with the guide 46 is a drive shaft 48 on which there is mounted a pair of spaced pulleys 50. Disposed in the lower part of the housing 20 and suitably mounted relative to the side walls 30 and 32 is an idler shaft 52. The idler shaft 52 is also aligned with the guide 46 and has mounted thereon a pair of spaced pulleys 54, the pulleys 54 being vertically aligned with the pulleys 50.

Entrained over the pulleys 50 and 54 is a pair of spaced belt members 56. Extending between the belt members 56 and connecting the two together are a plurality of buckets 58. The buckets 58 are also carried by the belt members 56 for movement vertically in the housing 20 about the guide 46. It is to be noted that the buckets 58 are of a size so that they extend between the guide 46 and the end walls 26 and 28 of the housing 20.

In order to facilitate the loading of the buckets 58 with ensilage to be dumped into the storage building 10 there is mounted within the lower part of the housing 20 a boot 60. The bottom part of the boot 60 has a curvature identical with the path traveled by the lowermost or outermost edges of the buckets 58 so that there is provided a scooping action of the ensilage into the individual buckets 58 as they travel through the boot 60. The upper part of the housing 20 remote from the storage building 10 is also provided with a curved deflector 62. The deflector 62 insures that the path of the ensilage from the buckets 58 is down towards the chute 38 so that the ensilage passes into the storage building 10 when discharged from the buckets 58.

Figure 2:
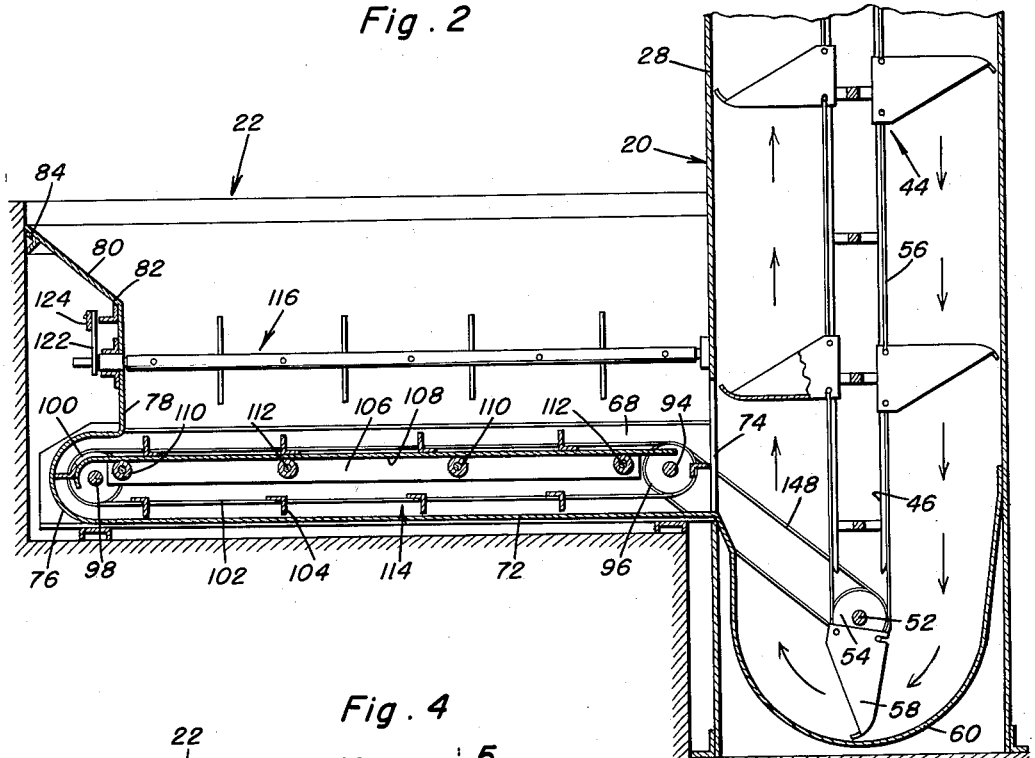
Figure 2 is an enlarged fragmentary vertical sectional view taken through the lower part of the silage elevator and shows the general details of the hopper thereof and the lower part of the vertical conveyor including the relationship between the horizontal conveyor and the hopper and the vertical conveyor.

The hopper 22 includes an elongated narrow bottom part 64 which is best illustrated in Figure 5. The bottom part 64 is mounted on suitable frame members 66 within the shallower pit portion 18 and includes a pair of sidewalls 68 which have bottom forming portions 70 resting upon the frame members 66. Extending between the bottom forming portions 70 is a bottom plate 72. The bottom plate 72, as is best illustrated in Figure 2, terminates at the upper edge of the boot 60 to facilitate the travel of ensilage into the boot 60. The end of the narrow bottom part 64 adjacent the housing 20 is open, there being provided an opening 74 in the end wall 28 for the passage of ensilage. The opposite end of the narrow bottom part 64 is closed by a curved end wall 76, the end wall 76 being generally semi-circular in cross section.

Extending upwardly from the end wall 76 is an intermediate end wall 78. The end wall 78 is vertically disposed and is in spaced parallel relation with respect to the end wall 28 of the housing 20. Incidentally, the end wall 28 of the housing 28 forms an end wall of the hopper 22. The end wall 78 terminates in an upwardly and outwardly sloping upper end wall portion 80. The end wall portion 80 is reinforced by suitable frame members 82 and 84.

Disposed at the upper edges of the side walls 68 are frame members 86. The frame members 86 are reinforced by transverse frame members 88 disposed at opposite ends thereof. The transverse frame members 88 extend upwardly and outwardly from the side walls 68 and have connected thereto longitudinal frame members 90. Extending between the frame members 86 and 90 are upwardly and outwardly sloping side walls 92. The ends of the side walls 92 are connected to the end walls 78 and 80 and to the end wall 28 of the housing 20. It is to be noted that the side walls 92 have their lower ends disposed below the uper edges of the side walls 68 so as to direct ensilage into the center of the narrow bottom part 64.

Extending between the side walls 68 adjacent the housing 20 and suitably journaled for rotation is a driveshaft 94. The driveshaft 94 has mounted on opposite ends thereof pulleys 96. A similar idler shaft 98 extends between the side walls 68 of the point remote from the housing 20 and is suitably journaled relative thereto.

The idler shaft 98 has has disposed on opposite ends thereof pulleys 100 which are aligned with the pulleys 96. Entrained over the pulleys 96 and 100 are spaced endless belts 102. Extending between the endless belts 102 and connecting the two together are scraper bars 104. The scraper bars 104 ride slightly above the bottom wall 72 for moving ensilage therealong.

Extending between the side walls 68 and extending substantially the full length of the narrowed bottom part 64 is a channel-shaped cross sectional member 106 which provides a flat plate portion 108 over which the scraper bars 104 may pass in their uppermost travel. The plate 108 is supported intermediate its ends by rollers 110 mounted on transverse rods 112. The plate 108 is positioned for initially receiving ensilage and supporting the ensilage for movement toward the vertical conveyor 44 by the components of the horizontal conveyor which is referred to in general by the reference numeral 114.

The hopper 2 is intended to be of a size so as to receive a farm wagon or truck load of ensilage. Since the ensilage is relatively loose and has a tendency to support itself, it will normally not fall into the lower part 64 of the hopper 22. Therefore, there are mounted above the lower part 64 between the side walls 92 agitators 116. Each agitator 116 includes an elongated shaft 118 which extends between the end wall 78 of the hopper 22 and the end wall 28 of the housing 20 and is suitably journaled relative thereto for oscillatory movement. Carried by each shaft 118 at longitudinal intervals are a plurality of radiating fingers 120. The fingers of the two agitators 116 are preferably staggered so as to increase the agitating effect thereof.

In order that the agitators 116 may be oscillated, there is connected to the shafts 118 to the left of the end wall 78, as viewed in Figure 2, a pair of rocker arms 122. The rocker arms have pivotally connected to the upper ends thereof a rocker bar 124.

Suitably journaled relative to the end walls 78 is a shaft 126 carrying a wheel 128. If desired, the wheel 128 may also be in the form of a pulley. Extending between the wheel 128 and the rocker bar 124 is a connecting rod 130. Thus as the wheel 128 rotates, the rocker bar 124 is shifted back and forth to oscillate the agitators 116.

In order to effect the driving of the vertical conveyor 44, the horizontal conveyor 114 and the agitators 116, there is carried by the upper part of the housing 20 externally thereof a suitable power unit 132 which is preferably in the form of an electric motor. The power unit 132 includes a drive pulley 134 which is aligned with a pulley 136 mounted on the idler shaft 138. Entrained over the pulleys 134 and 136 and connecting the two together is a drive belt 140.

Also mounted on the idler shaft 138 is a second pulley (not shown) identical with the pulley 136. Aligned with this second pulley is a pulley 142, carried by the driveshaft 48 for the vertical conveyor 44. Entrained over the second pulley and the pulley 142 is a drive belt 144.

In order that the horizontal conveyor 114 may be driven from the vertical conveyor 44, there is mounted on the idler shaft 52 of the vertical conveyor 44 a pulley 146. The pulley 146 is aligned with a pulley (not shown) carried by the shaft 94 of the horizontal conveyor 114.

Entrained over the pulley carried by the shaft 94 and the pulley 146 is a drive belt 148.

As is best illustrated in Figure 5, the shaft 98 extends outwardly of one of the side walls 68 and is provided with a pulley 150. The pulley 150 is vertically aligned with the wheel 128 which functions as a pulley and the two are connected together by a drive belt 152.

From the foregoing, it will be apparent that the power unit 132 drives the vertical conveyor 44 which in turn drives the horizontal conveyor 114, which in turn drives the agitators 116.

Because of the necessity of the pit 14, there may be a collection of ground water. Therefore, if it is desired, there may be mounted in the relatively deep portion, a sump pump 154. The sump pump 154 is best illustrated in Figure 1.

In view of the foregoing, it will be readily apparent that there has been devised an ensilage elevator which is so constructed whereby a farmer may dump an entire truck or wagon load of ensilage into the hopper thereof and may then return the farm wagon or truck to the field for another load while the ensilage elevator is in the process of elevating the ensilage into the upper part of the silo or storage building. By so constructing the ensilage elevator, it will be readily apparent that it is no longer necessary to tie up the farm wagon or truck during the time-consuming ensilage elevating operation. This results in a great saving of the farmer's time at a time when it is very valuable, that is, in the harvest season.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The combination of an ensilage storehouse resting on the ground and provided in one side adjacent the top thereof with a loading opening, a pit provided in the ground adjacent said storehouse and substantially contiguous with said one side of the storehouse, and an ensilage elevator mounted in said pit and including a vertically elongated housing extending upwardly from the bottom of said pit alongside said one side of the storehouse to a point above said loading opening, a hopper disposed in the pit at one side of the bottom portion of said housing, the top of said hopper being substantially flush with the ground level, horizontal conveyor means provided in the bottom of said hopper and discharging into the bottom of said housing, vertical conveyor means provided in said housing and extending from the bottom thereof to discharge into said loading opening, and means for actuating said conveyor means, oscillatable ensilage agitating means in said horizontal hopper for insuring downward delivery of ensilage to said horizontal conveyor means, a pitman drive for oscillating said agitator means, operating connections between one end of said horizontal conveyor means and said pitman drive, said oscillatable means comprising a pair of rock shafts, radial agitator fingers on each rock shaft staggered longitudinally on each shaft relative to those on the other shaft whereby ensilage will be agitated downwardly through said horizontal conveyor with little breakage and mutilation of said ensilage, said horizontal conveyor including an endless carrier having a plurality of longitudinally spaced, transversely extending and laterally projecting ensilage engaging members, said endless carrier comprising an endless flexible member disposed into vertically spaced and horizontally disposed reaches, one end of said horizontal conveyor communicating with said vertical conveyor, a horizontal bottom plate in said conveyor closely underlying said ensilage engaging members and terminating at the other end of said horizontal conveyor in an upwardly curving end wall extending into the hopper above said horizontal conveyor, said ensilage engaging members passing in closely spaced relation to said end wall during movement from the lower reach to the upper reach of said horizontal conveyor, said vertical conveyor being in the form of a plurality of buckets mounted on an endless carrier, a boot mounted in the lower part of said housing, the outer free edges of said buckets passing in closely spaced relation relative to said boot to insure the loading of said buckets with little breakage and mutilation of said ensilage.

2. The combination as defined in claim 1 wherein said pit includes a relatively deep portion having the bottom of said housing therein and a relatively shallow portion accommodating said hopper, whereby the bottom of the hopper is spaced above the bottom of the housing.

3. In an ensilage elevator, the combination of a pit provided in the ground adjacent a storehouse into which ensilage is to be elevated, a vertically elongated housing extending upwardly from the bottom of said pit and having a discharge opening adjacent its upper end adapted for delivery of elevated ensilage into the top of the stated storehouse, a hopper disposed in said pit at one side of the bottom portion of said housing, the top of said hopper being substantially flush with the ground level, horizontal conveyor means provided in the bottom of said hopper and discharging into the bottom of said housing, vertical conveyor means provided in said housing and extending from the bottom thereof to discharge through said discharge opening, and means for actuating said conveyor means, oscillatable ensilage agitating means in said horizontal hopper for insuring downward delivery of ensilage to said horizontal conveyor means, a pitman drive for oscillating said agitator means, operating connections between one end of said horizontal conveyor means and said pitman drive, said oscillatable means comprising a pair of rock shafts, radial agitator fingers on each rock shaft staggered longitudinally on each shaft relative to those on the other shaft whereby ensilage will be agitated downwardly through said horizontal conveyor with little breakage and mutilation of said ensilage, said horizontal conveyor including an endless carrier having a plurality of longitudinally spaced, transversely extending and laterally projecting ensilage engaging members, said endless carrier comprising an endless flexible member disposed into vertically spaced and horizontally disposed reaches, one end of said horizontal conveyor communicating with said vertical conveyor, a horizontal bottom plate in said conveyor closely underlying said ensilage engaging members and terminating at the other end of said horizontal conveyor in an upwardly curving end wall extending into the hopper above said horizontal conveyor, said ensilage engaging members passing in closely spaced relation to said end wall during movement from the lower reach to the upper reach of said horizontal conveyor, said vertical conveyor being in the form of a plurality of buckets mounted on an endless carrier, a boot mounted in the lower part of said housing, the outer free edges of said buckets passing in closely spaced relation relative to said boot to insure the loading of said buckets with little breakage and mutilation of said ensilage.

References Cited in the file of this patent

UNITED STATES PATENTS

| | | |
|---|---|---|
| 587,271 | Peterson | July 27, 1897 |
| 1,363,230 | Clark | Dec. 28, 1920 |
| 1,433,754 | Stone | Oct. 31, 1922 |
| 1,521,276 | Cave et al. | Dec. 30, 1924 |
| 1,809,796 | Beardsley et al. | June 9, 1931 |
| 2,315,866 | McBean | Apr. 6, 1943 |
| 2,321,838 | McBean | June 15, 1943 |
| 2,631,969 | Klueger | Mar. 17, 1953 |

FOREIGN PATENTS

| | | |
|---|---|---|
| 60,889 | Denmark | Apr. 19, 1943 |